Patented Sept. 5, 1939

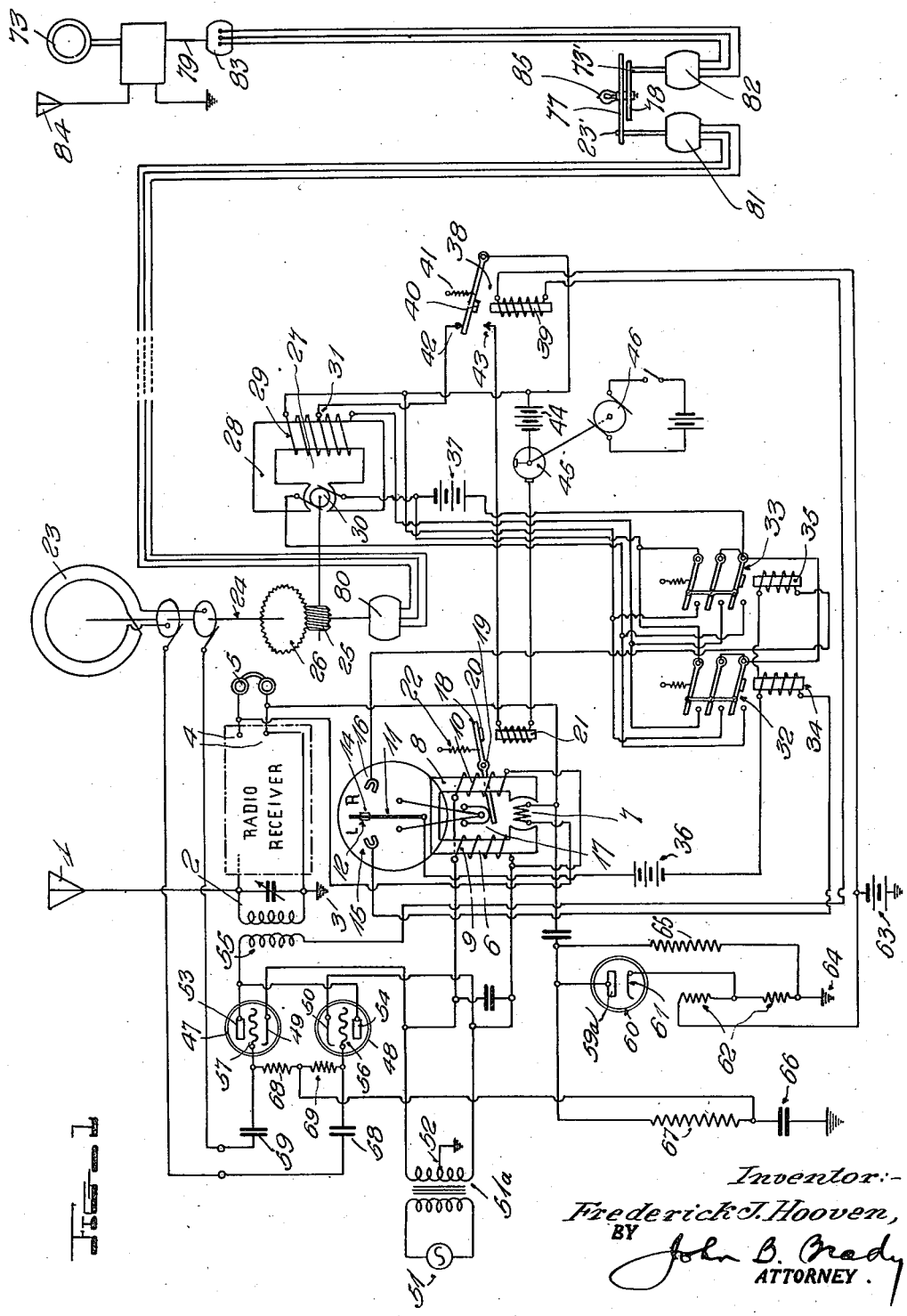

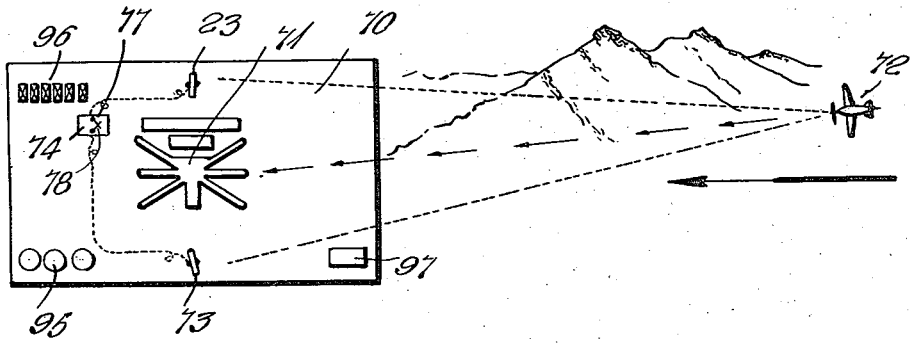

2,171,561

UNITED STATES PATENT OFFICE 2,171,561

AIR NAVIGATION AND LANDING SYSTEM

Frederick J. Hooven, Dayton, Ohio

Application July 16, 1936, Serial No. 90,995

13 Claims. (Cl. 250—11)

My invention relates broadly to systems of navigation and landing of aircraft and more particularly to a means for generally improving the safety of operation of aircraft.

One of the objects of my invention is to provide a system for automatically indicating to a ground station the relative position of aircraft in flight to the ground station and with respect to a landing field.

Another object of my invention is to provide a system for representing in similitude at a ground station the position of an aircraft with respect to the ground station for facilitating the control of air traffic from the ground station.

Still another object of my invention is to provide a system whereby signals transmitted from an aircraft in flight actuate receiving devices at a ground station for automatically indicating at the ground station the relative position of the aircraft with respect to the ground station for allowing the ground station to thereby readily direct the movement of air traffic.

A further object of my invention is to provide a system of circuits for controlling the operation of automatic devices at a ground station in a system of air navigation whereby rapid response of the control apparatus at the ground station is assured upon the transmission of signals from an aircraft.

A still further object of my invention resides in an electrical circuit arrangement for directive receiving devices at a ground station whereby signals transmitted from an aircraft control the automatic orientation of the directive receiving devices with varying degrees of angular velocity according to the position of the aircraft with respect to the ground station for correspondingly controlling indicating apparatus at the ground station for facilitating the control of air traffic.

Other and further objects of my invention reside in the electrical circuit arrangement for the control apparatus in the ground station in a system of air navigation or aircraft landing as set forth more fully in the specification hereinafter following by reference to the accompanying drawings, in which Figure 1 illustrates diagrammatically the apparatus at the landing field which I provide for indicating to the traffic supervisor the movement of aircraft with respect to the landing field; Fig. 2 is a schematic view illustrating the arrangement of an aircraft landing field with an air craft approaching the field, the course of which is indicated at the aircraft landing field by means of the indicating apparatus of my invention; Fig. 3 is a plan view of the indicating apparatus of my invention; Fig. 4 is a cross-sectional view taken through the indicating apparatus on line 4—4 of Fig. 2; and Fig. 5 is a fragmentary view of the coacting arms which support the illuminating device which serves to visually indicate the path of the aircraft approaching the landing field.

The system of my invention provides means for visually indicating at the landing field the course of approaching aircraft for allowing a traffic supervisor at the airport to inform the pilot of the aircraft with respect to landing conditions. The system automatically indicates to the traffic supervisor at the airport the direction and course of approach of the incoming aircraft under conditions of fog, darkness, or poor visibility, for a considerable time before the aircraft becomes visible at the landing field. I provide receiving stations located in spaced positions on the landing field each having directive antennae systems with means for automatically orienting the antennae system. The circuit arrangement for the orientation control means provides a special feature of my invention. When the plane of the loop is off-course with respect to a line of direction from the loop to the radio transmitter on the approaching aircraft, the orientation means operates relatively quickly. When the plane of the loop is moved into a position on-course with respect to the transmitter on the approaching aircraft, the driving means operates more slowly. This variable speed arrangement insures a quick and accurate response of the receiving apparatus to the signals of the approaching aircraft. That is, the orientation is effected at greater speed when the loop is off-course with respect to the line of bearing to the aircraft transmitter than when the loop is closer to the on-course relation to the line of bearing between the loop and the transmitter on the aircraft. This gives the relative speeds best suitable for bringing the directional loops into proper aligned positions with respect to the line of direction between the loops and the transmitter on the approaching aircraft. The positions to which the loops at the separated receiving stations are automatically oriented are reproduced upon an indicating apparatus which I have devised and which is arranged before the traffic supervisor at the landing port. The indicating apparatus includes a reproduction in similitude of the landing field and the area immediately surrounding the landing field. A pair of coacting arms are provided, each of which are angularly shifted in a manner corresponding to the angular displacement of the loop antennae at the landing field. The junction of the coacting arms carries a light source having means for projecting a spot of light upon the replica of the landing field. The spot of light designates the relative position occupied by the aircraft with respect to the landing field. The spot of light moves toward the landing field as the aircraft approaches the landing field. The traffic supervisor may inform the pilot of landing condition and reroute the aircraft to insure a safe landing. The traffic supervisor is informed at all times of the relative position of the aircraft with respect to the landing field even though the aircraft is invisible with respect to the landing field.

Referring to Fig. 1 which illustrates in detail the circuits of each of the automatic direction indicating compasses, each of the radio direction finders consists of a radio receiver tuned to the frequency of the wave emitted by the transmitter carried by the aircraft. Each of the radio receivers incorporates a directional antenna and a non-directional antenna, said directional antenna having the characteristic that it receives no energy from the source of the emitted wave, when a line normal to the plane of said directional antenna passes through said source. When said directional antenna deviates from that position wherein no energy is received from said source, the instantaneous polarity of energy received from said source by said directional antenna is a function of the sense of said deviation. A bipolar relay is connected to the output of said receiver, which is caused by means described elsewhere, to close in one direction if the said deviation is, for instance to the right, and to close in the opposite direction if said deviation is, for instance, to the left of a line between said aircraft and said direction finder. Said directional antenna is caused to rotate by a motor whose direction of rotation is controlled by the sense of closing of said bi-polar relay, in such manner that if a deviation occurs to the right, said motor will cause said directional antenna to turn to the left, and vice versa.

By such means said directional antenna is caused at all times to maintain a position whereby a line, normal to the plane of said directional antenna and passing through the axis of the rotation thereof, will intersect the transmitter carried by said aircraft. Each of the rotating arms mounted on the miniature or replica is caused to assume a position on said miniature dpending upon the position of the loop antennae at the ground stations.

Reference character 1 designates the non-directional antenna connected to input system 2 of the radio compass receiver at the ground station. The receiver is connected to ground 3. The output of the receiver has been indicated connected to terminals 4 and as connected to both the aural receiving device, such as telephones 5, and also relay device 6. The relay device 6 comprises armature winding 7 angularly movable within the electromagnetic structure 8 having control windings 9 and 10. The angularly shiftable arm 11 is moved under control of the armature winding 7 and carries opposite contact members 12 and 14 adapted to make contact respectively with fixed contacts 15 and 16. The fixed contacts 15 and 16 may comprise magnetic elements coacting with contacts 12 and 14 formed from magnetic material so that the arm 11 when shifted to either of the limiting positions thereof remains in the shifted position. By reason of the stick magnetic characteristic of the device I provide special means for restoring the arm 11 to central position. Restoring means comprises a yoked-shaped member 17 carried by pivoted arm 18 pivoted at 19. The pivoted arm 18 has an armature 20 thereon which may be operatively controlled by means of magnet 21 against the action of spring means 22.

The operation of the restoring mechanism will be clearer after a consideration of the loop actuating mechanism. The coil antenna or loop or directional antenna 23 is mounted on an angularly shiftable or rotatable shaft 24 which is suitably geared to a driving motor system. For purposes of explaining my invention I have shown the loop orienting mechanism schematically as comprising a worm gear 25 for driving gear 26 connected with rotary shaft 24, but it will be understood that various forms of driving mechanism may be provided. The driving motor 27 comprises field magnet system 28, field winding 29 and the rotary armature 30. The field winding 29 is tapped at 31 as indicated. In order to control the direction of rotation of the driving motor 27 I provide automatic reversing switches 32 and 33, which are individually controlled by electromagnetic systems 34 and 35 dependent upon the movement of arm 11 to the left or right, respectively. That is to say, the arm 11 in moving to the left establishes a connection between movable contact 12 and fixed contact 15, thereby energizing electromagnetic actuating device 34 from potential source 36. In the event that arm 11 shifts to the right a connection is established between movable contact 14 and fixed contact 16 through electromagnetic actuating device 35 and potential source 36. The source of potential 37 for driving motor 27 is reversed with respect to the field winding 29 under control of the reversing switches 32 and 33 for determining the direction of rotation of the driving gear 25.

In order to control the rate of movement of the driving gear 25 depending upon the angular relation of coil antenna 23 to the direction of the radiant energy source, I provide a relay 38 comprising a magnet 39, an armature 40, and a spring 41. Spring 41 is so adjusted that when the current through magnet 39 falls below a predetermined fixed value, the armature 40 will be pulled away from the magnet, thereby establishing electrical contact between armature 40 and contact 42. When the current in magnet 39 exceeds a certain fixed value the armature is pulled toward magnet 39 establishing contact between armature 40 and contact 43. The restoring means applied to relay 8 which consists of yoke 17, arm 18, pivot 19, armature 20, magnet 21, previously referred to, is operated from potential source 44 through rotating contactor 45 driven by motor 46 in such a fashion that the arm 11 of indicator 8 is periodically restored to the central position. The circuit through magnet 21, potential source 44, and interrupter 45 includes, however, armature 40 and contact 45 so that said restoring process takes place only when armature 40 is in contact with contact 43, or at such time that the current in coil 39 exceeds the predetemined value previously referred to.

I provide means for modulating the radio frequency current in loop 23 by means of a balanced modulator consisting of electron tubes 47 and 48. The cathodes 49 and 50 of these tubes are connected to opposite ends of the secondary of a transformer whose primary is connected to oscillator 51 and the electrical center of whose secondary is connected to ground at 52. The anodes 53 and 54 of tubes 47 and 48 are connected to coupling coil 55 so that the signal from loop 23, which is impressed on grids 56 and 57 of tubes 48 and 49 through coupling condensers 58 and 59, is modulated by the frequency of the oscillator 51 and impressed on the signal from the non-directional antenna 1. The combined signals are amplified and demodulated by radio receiver 3 and the resulting alternating current of the frequency of oscillator 51 is impressed on the moving coil 7 of the indicator 8.

The actuating coils 9 and 10 of the relay 8 are connected to the secondary of the transformer 51a so that magnetic flux is impressed upon the magnetic circuit of relay device 6. It will be seen that there will be present in the output circuit 4 of radio receiver 3 a current the frequency of which is that of oscillator 51, the amplitude of which is proportional to the signal picked up by loop 23 and, therefore, proportional to the angle of deviation of loop 23 from the line to the source of radiant energy, and the phase angle of which, with respect to the current in coils 9 and 10, is dependent on the phase angle of the radio frequency current picked up by loop 23 with respect to the radio frequency current picked up by non-directional antenna 1. The phase angle of the output circuit with respect to that in coils 9 and 10 is, therefore, a function of the direction of deviation of loop 23 from the line to the source of radiant energy. It will then be seen that the movable arm 11 connected to coil 7 will move to the left or to the right in accord with movement of loop 23 to the left or to the right of the line to the source of radiant energy.

The magnetic switches 32 and 33 are so connected to motor 27 and source 37 that when the loop 23 rotates to the left and the relay 8 moves also to the left the motor 27 will be caused to turn the loop to the right. Conversely, if the source of radiant energy moves to the right the loop will then be to the left of the line between the loop and said source. Arm 11 will then move to the left, switch 32 will then close, and the loop will be caused to turn to the right. Because of the magnetic attraction existing between fixed magnetic contacts 15 and 16 and magnetic contacts 12 and 14 fixed to arm 11, it is necessary that the restoring means 17 be actuated intermittently when the magnetic control winding 39 is energized by virtue of the current flow incident upon the impression of signal energy on the balanced amplifier circuit from loop 23.

I have pointed out that the intensity of the signal which actuated relay 6 is proportional to the degree of deviation of the loop 23 from the line to the source of radiant energy. In order that this signal may not become any greater than that required for the actuation of relay 6, when the deviation of loop 23 from said line is great, I have provided means whereby the sensitivity of tubes 47 and 48 may be decreased by the signal in the output circuit 4 if the signal amplitude delivered by radio receiver 3 exceeds this desired value. Connected to the output circuit 4 of radio receiver 3 is the anode 59a of rectifier 60. Cathode 61 of rectifier 60 is maintained by means of potentiometer 62, connected between source 63 of high potential and ground at 64, at a constant positive potential with respect to current which is equal to the peak value of that signal necessary to give the desired deflection of relay 6, so long as the value of that signal which is also impressed on plate 59a of rectifier 60 does not exceed the amount necessary to deflect relay 6. Anode 59a will then be negative at all times with respect to cathode 61, and no current will flow through rectifier 60. Whenever the signal energy impressed on coil 7 exceeds the said predetermined value the anode 59a will become positive with respect to cathode 61 and current will flow through rectifier 60 from anode 59a. Current flowing from ground through resistance 65 to anode 59a thence to cathode 61 through potentiometer 62 back to ground, causes anode 59a to assume a mean potential with respect to ground, thereby charging condenser 66 through resistance 67 negatively with respect to ground  This negative potential is communicated through resistances 68 and 69 to grids 56 and 57 of tubes 47 and 48, thereby decreasing the transconductance directly in proportion to the amount by which the signal impresed on coil 7 exceeds the predetermined positive potential of cathode 61. In this manner the modulated energy transmitted to radio receiver 3 from loop 23 through coil 55 is limited when its value exceeds that necessary to actuate the relay 6.

It will be understood by those skilled in the art of electron tubes that when the negative charge is impressed on grids 56 and 57 the anode current of tubes 47 and 48 will be decreased in proportion to the magnitude of the negative charge. It then follows that when loop 23 is at an angle to the line between the loop and the source of radiant energy greater than that necessary to provide adequate actuating means for relay 6, the plate current in tubes 47 and 48 will be decreased proportionately. The anode currents of tubes 47 and 48 flow through magnet 39 and the predetermined value referred to above in connection with the description of relay 38 is that value of the combined plate current of tubes 47 and 48 which is obtained when the loop 23 is on or adjacent to the line of the source of radiant energy. Thus, when the angle of the loop with respect to said line exceeds that value where the signal in coil 7 is adequate to control relay 6, relay 38 will open due to the reduced plate currents in plates 47 and 48 as explained hereinbefore, thereby closing the contact 42 whereby armature 40 is short-circuiting a part of the field coil 29 of motor 27, causing motor 27 to run at high speed. When the loop 23 is turned by means of gears 25 and 26 as has been explained above, and as the loop approaches the line to the source of radiant energy the plate current in tubes 47 and 48 will cause the magnet 39 to pull armature 40 with sufficient force to overcome the force of spring 41, thereby establishing a connection between armature 40 and contact 43 which removes the short-circuit from the portion of the field coil 29 and thus causes the motor 27 to run slowly, at the same time completing the circuit through the magnet 21, source 44, interrupter 45. Thus, there is initiated into operation, the mechanical restoring means 17 which will periodically restore the indicator arm 11 to the center point between fixed contacts 15 and 16 until such time as loop 23 shall be in a plane normal to a line drawn to the source of radiant energy, and the signal will disappear and output circuit 4 and the system will come to rest at equilibrium. Thus, I have established that when the loop is near the desired orientation the speed of its motor will be slow and the interrupting mechanism will function, but when the loop is far from the desired course the operating motor will operate at high speed and the relay will not be interrupted by the restoring mechanism.

The second pick-up station on the landing field includes loop 73 capable of automatic orientation and nondirectional antenna 1 connected to a radio receiver and automatic orientation control mechanism similar to the arrangement heretofore described. Each of the directional antennae which are capable of automatic orientation have mechanical connections to devices designed to transmit angular motion. I employ in the system of my invention angular motion transmitters of the "selsyn" generator type. I have shown a "selsyn" generator at 80 connected to shaft 24 of directional antenna 23. I have illustrated a "selsyn" generator 83 connected with the rotary shaft 79 of directional antenna 73. "Selsyn" generator 80 is connected through a line wire system with the "selsyn" motor or responsive device 81 while "selsyn" generator 83 is connected through a line wire system with the "selsyn" motor or responsive device 82 located at the indicating position in the office of the aircraft traffic supervisor. The motors 81 and 82 drive angularly movable arms 77 and 78 which carry at their intersection the light source 85 as it will be described in more detail hereinafter.

Fig. 2 represents schematically the arrangement of the ground equipment in the landing system of my invention, where reference character 70 designates a landing area in which the runway for aircraft indicated at 71 may be located, and on which the aircraft indicated at 72 is adapted to effect a landing. The ground equipment includes a plurality of automatic direction indicating compasses which I have indicated at 23 and 73, disposed at separated positions within the landing area 71. Each of the automatic direction indicating compasses includes the mechanism described in connection with Fig. 1 for automatically orienting the compasses in accordance with signal energy transmitted from aircraft 72. The means for automatically orienting the compasses has been heretofore described in connection with Fig. 1. The automatic orienting mechanism operates to move the loop antennae 23 and 73 to present the planes of the direction indicating compasses normal to a line extending through the axis of the compass and through the axis of the transmitter on the distant aircraft 72. The aircraft 72 contains a transmitter for emitting energy uniformly in all directions, which energy is intercepted by the automatic direction indicating compasses at 23 and 73.

The arrangement provides means for indicating on the ground the position of an aircraft when at remote distances or when flying in darkness or under conditions of poor visibility. The ground equipment consists of two radio direction finders at 23 and 73, tuned so as to receive energy emitted from the radio transmitter on aircraft 72. Each of said radio direction finders at 23 and 73 is equipped with means whereby the directional antennae thereof are caused to assume a position normal to a line from the aircraft to the radio direction finder, as will be hereinafter described in greater detail. At a suitable control station 74 in the vicinity of the landing area is a miniature or replica of the landing area, as shown in Figs. 3 and 4.

The miniature or replica of the landing field is housed within a shallow cabinet 75. A ground glass plate 76 extends horizontally over the cabinet 75 and carries the reproduction of the landing area and surrounding territory thereon as indicated at 71'. The radio compass stations 23 and 73 on the actual landing field have their relative positions indicated at 23' and 73' on the replica as shown in Fig. 3. A pair of angularly movable arms 77 and 78 are arranged with their centers on the miniature at 23' and 73' corresponding to the location of the radio direction finders on centers 23 and 73 of the landing area 70. Means are provided whereby said angularly movable arms 77 and 78 are caused to automatically assume an angle corresponding to that of the line between the radio direction finder, whose location on the landing area corresponds with the location on said miniature and the center of said aircraft. Inasmuch as all said lines intersect in the aircraft, it follows that the intersection of said angularly movable arms 77 and 78 on said miniature will be a definite indication of the position of said aircraft with respect to the landing field.

The angularly movable arms 77 and 78 are each slotted at 77a and 78a. The slotted portions of the arms 77 and 78 coact as the arms shift laterally with respect to each other and serve as a guide for the light source 85. The light source 85 is mounted in an insulated carrier 92 which serves as a means for spacing the arms in predetermined relation. The mounting means for the light source is yieldably centered in carrier 92 by means of screw device 90 acting against coil spring 91 and disc members 88 and 89. Disc member 88 provides a slidable electrical contact with arm 77 while disc member 89 provides a slidable electrical contact with arm 78. The respective disc members connect with opposite sides of the light source 85 and serve to complete an electrical circuit extending through the arms 77 and 78 respectively with the light source 85 through electrical conductors indicated at 93 from the landing circuit or other power circuit connected with terminals 94. The arms 77 and 78 provide conductors for conveying the energy to the light source 85. In order to predetermine the size of the spot of light which is displayed against the ground glass plate 76 on which the replica of the landing field is reproduced, I provide an aperture 87 in a cover member or shield 86 which fits over the light source 85. This allows a spot of light to trace a path on the ground glass plate 76 which corresponds to the course movement of the distant aircraft toward the landing field.

The "selsyn" motors or angular motion responsive devices are indicated at 81 and 82 driving arms 77 and 78 on centers 23' and 73'. The motors 81 and 82 connect with the generators 80 and 83 respectively as indicated in Fig. 1 for transmitting angular motion from the directional antennae 23 and 73.

I have indicated various obstructions on the landing field generally at 95, 96 and 97. On the replica of the landing field, these obstructions are reproduced pictorially at 95', 96' and 97'.

While I have described my invention in its preferred embodiment, I desire that it be understood that modifications may be made and that no limitations are intended other than may be imposed by the scope of the appended claims.

What I claim as new and desire to secure by Letters Patent of the United States is as follows:

1. In an air navigation and landing system, a landing field, a plurality of angularly movable loop antennae, means for automatically orienting each of said loop antennae in accordance with signaling energy received from an aircraft transmitter, and means for controlling the rate of orientation of said loop antennae depending upon the bearing of the aircraft transmitter with respect to the said plurality of loop antennae.

2. In an air navigation and landing system, a landing field, a plurality of angularly movable loop antennae, means for automatically orienting each of said loop antennae in accordance with signaling energy received from an aircraft transmitter, and circuits controlled by the signaling energy received by each of said loop antennae for controlling the orientation thereof at either of two rates according to the bearing of the aircraft with respect to said loop antennae.

3. In an air navigation and landing system, a landing field, a plurality of angularly movable loop antennae, means for automatically orienting each of said loop antennae in accordance with signaling energy received from an aircraft transmitter, and circuits controlled by signaling energy received by each of said loop antennae for angularly moving said loop antennae at a greater velocity when the aircraft is off-course with respect to said plurality of loop antennae than when the aircraft is on-course with respect to said loop antennae.

4. In an air navigation and landing system, a landing field, a plurality of angularly movable loop antennae, means for automatically orienting each of said loop antennae in accordance with signaling energy received from an aircraft transmitter, drive means for each of said loop antennae, circuits connected with each of said loop antennae for controlling said drive means and means for operating said drive means at a greater velocity when the planes of said loop antennae are off-course with respect to the aircraft transmitter than when the planes of said loop antennae are on-course with respect to said aircraft transmitter.

5. In an air navigation and landing system, a landing field, a plurality of angularly movable loop antennae, means for automatically orienting each of said loop antennae in accordance with signaling energy received from an aircraft transmitter, drive means for each of said loop antennae, circuits connected with said loop antennae for controlling the speed of operation of said drive means at either of two rates according to the amplitude of the signal energy received by said loop antennae from the aircraft transmitter.

6. In an air navigation and landing system, a landing field, a plurality of angularly movable loop antennae, means for automatically orienting each of said loop antennae in accordance with signaling energy received from an aircraft transmitter, drive means connected with each of said loop antennae, and circuits connected with said loop antennae for controlling the speed of operation of said drive means in accordance with two differing relative amplitudes of received signal energy.

7. Apparatus for indicating the position of an aircraft with respect to a navigable course comprising a directive radio receiving system, a right- and left-hand course indicator responsive to signals received from a transmitter on an aircraft, electrical circuit contacts disposed for coaction with said indicator, said right- and left-hand indicator having a neutral position between said contacts, and means for periodically restoring said indicator to neutral position.

8. Apparatus for indicating the position of an aircraft with respect to a navigable course comprising a directive radio receiving system, a right- and left-hand course indicator responsive to signals received from a transmitter on an aircraft, said right- and left-hand indicator having a neutral position, a control circuit responsive to signal energy received from the aircraft transmitter, and means operated by said control circuit when the amplitude of the received signal energy reaches a predetermined level for periodically restoring said indicator to neutral position.

9. In an indicating apparatus for indicating the position of aircraft with respect to a ground station comprising a directional receiving system for receiving signaling energy from an aircraft transmitter, an indicator movable from a neutral position to either of two limiting positions depending upon the bearing of an aircraft transmitter with respect to the directional receiving system at the ground station, a control circuit responsive to energy received by said directional receiving system, and means responsive to said control circuit for periodically restoring said indicator to neutral position depending upon the amplitude of the signal energy received by said directional receiving system and impressed on said control circuit.

10. In an indicating apparatus for indicating the position of aircraft with respect to a ground station comprising a directional receiving system for receiving signaling energy from an aircraft transmitter, an indicator movable from a neutral position to either of two limiting positions depending upon the bearing of an aircraft transmitter with respect to the directional receiving system at the ground station, a control circuit responsive to energy received by said directional receiving system, means responsive to said control circuit for periodically restoring said indicator to neutral position depending upon the amplitude of the signal energy received by said directional receiving system and impressed on said control circuit, said directional receiving system including a loop antenna, means including said indicator for automatically orienting said loop antenna, and means operated by the aforesaid control circuit for determining the rate of movement of said orienting means.

11. In an indicating apparatus for indicating the position of aircraft with respect to a ground station comprising a directional receiving system for receiving signaling energy from an aircraft transmitter, an indicator movable from a neutral position to either of two limiting positions depending upon the bearing of an aircraft transmitter with respect to the directional receiving system at the ground station, a control circuit responsive to energy received by said directional receiving system, means responsive to said control circuit for periodically restoring said indicator to neutral position depending upon the amplitude of the signal energy received by said directional receiving system and impressed on said control circuit, and means responsive to energy received by said directional receiving system for automatically orienting said loop antenna.

12. In an indicating apparatus for indicating the position of aircraft with respect to a ground station comprising a directional receiving system including a loop antenna, means for automatically orienting said loop antenna, variable speed control circuits for said means, said means including an indicator movable from a neutral position to either of two limiting positions depending upon the bearing of an aircraft transmitter with respect to the directional receiving system at the ground station, a control circuit responsive to energy received by said directional receiving system, means responsive to said control circuit for periodically restoring said indicator to neutral position depending upon the amplitude of the signal energy received by said directional receiving system and impressed on said control circuit, and means controlled by said control circuit for governing the operation of said variable speed control circuits.

13. Indicating apparatus for designating the movement of an aircraft on the replica of a flying course comprising a directive signal receiving system including a loop antenna, means for automatically orienting said loop antenna according to the bearing of an aircraft transmitter with respect to the plane of the loop antenna, said means including an indicator movable to a neutral position from either of two opposite limiting positions, variable speed means for governing the operation of said means for automatically orienting said loop antenna, and a control circuit connected to said directive signal receiving system and operative to govern the operation of said variable speed means and to periodically restore said indicator to neutral position.

FREDERICK J. HOOVEN.